(12) United States Patent
Zhang et al.

(10) Patent No.: US 9,464,576 B2
(45) Date of Patent: Oct. 11, 2016

(54) SYSTEM AND METHOD FOR OPERATING A POWER PLANT

(71) Applicant: General Electric Company, Schenectady, NY (US)

(72) Inventors: Hua Zhang, Greenville, SC (US); Wenjie Wu, ShangHai (CN); Yongjiang Hao, ShangHai (CN)

(73) Assignee: General Electric Company, Schenectady, NY (US)

(*) Notice: Subject to any disclaimer, the term of this patent is extended or adjusted under 35 U.S.C. 154(b) by 422 days.

(21) Appl. No.: 14/037,268

(22) Filed: Sep. 25, 2013

(65) Prior Publication Data
US 2014/0238039 A1 Aug. 28, 2014

(30) Foreign Application Priority Data
Feb. 28, 2013 (CN) .................... 2013 2 0091797 U

(51) Int. Cl.
*F02C 7/236* (2006.01)
*F02C 9/40* (2006.01)
*F02C 3/04* (2006.01)
*F02C 7/22* (2006.01)
*F02C 3/045* (2006.01)

(52) U.S. Cl.
CPC .............. *F02C 9/40* (2013.01); *F02C 7/236* (2013.01); *F02C 3/04* (2013.01); *F02C 3/045* (2013.01); *F02C 7/22* (2013.01)

(58) Field of Classification Search
CPC ............ F02C 7/22; F02C 7/236; F02C 9/40; F02C 3/04; F02C 3/045; F02C 3/22
See application file for complete search history.

(56) References Cited

U.S. PATENT DOCUMENTS

| | | | | |
|---|---|---|---|---|
| 2,977,756 A * | 4/1961 | Stone ....................... | F02C 7/22 | 60/39.281 |
| 4,077,748 A | 3/1978 | Potz | | |
| 4,285,917 A * | 8/1981 | Knight ................. | B01D 53/002 | 423/220 |
| 4,561,542 A | 12/1985 | Przepiora et al. | | |
| 5,461,854 A * | 10/1995 | Griffin, Jr. ............ | F01K 21/047 | 60/39.53 |
| 5,488,823 A * | 2/1996 | Faulkner ................. | F02B 43/00 | 60/39.183 |
| 5,682,737 A | 11/1997 | Schmidli | | |
| 6,176,075 B1 * | 1/2001 | Griffin, Jr. ............ | F01K 21/047 | 60/775 |
| 6,199,366 B1 * | 3/2001 | Murata ..................... | F02C 3/22 | 60/734 |
| 7,980,052 B1 * | 7/2011 | Paulino .................... | F02C 3/10 | 60/39.15 |
| 2006/0119202 A1 * | 6/2006 | Kataoka .................... | F02C 7/08 | 310/152 |
| 2011/0083444 A1 * | 4/2011 | Bathina ...................... | F02C 3/22 | 60/776 |
| 2011/0308482 A1 * | 12/2011 | Hottovy .................... | F02C 3/28 | 123/3 |
| 2013/0255271 A1 * | 10/2013 | Yu ............................. | F02C 9/26 | 60/776 |

FOREIGN PATENT DOCUMENTS

| | | |
|---|---|---|
| CN | 96113283.3 | 8/1997 |
| EP | 0758045 A1 | 2/1997 |

\* cited by examiner

*Primary Examiner* — Phutthiwat Wongwian
*Assistant Examiner* — Rene Ford
(74) *Attorney, Agent, or Firm* — Fletcher Yoder, P.C.

(57) ABSTRACT

A system including a fuel-supply system including, an auxiliary-fuel-gas compressor configured to compress a fuel for use by a gas-turbine system, an expander configured to generate power by expanding an oxidant from the gas-turbine system, and a motor/generator configured to function in a motor mode and in a generator mode, wherein the motor/generator drives fuel compression with the auxiliary fuel-gas compressor in the motor mode, and the motor/generator generates power in the generator mode as the expander uses oxidant from the gas-turbine system to drive the motor/generator.

9 Claims, 4 Drawing Sheets

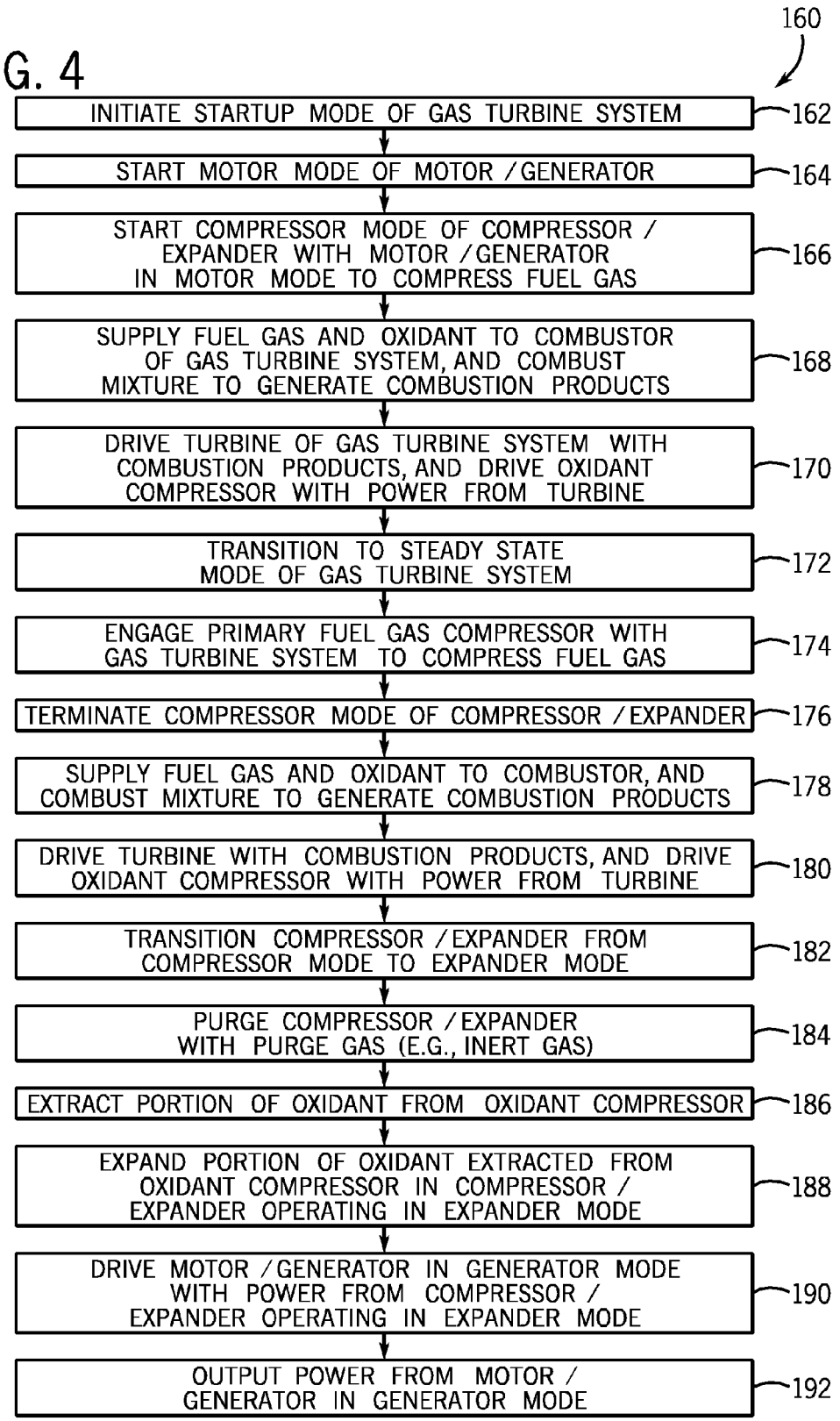

SYSTEM AND METHOD FOR OPERATING A POWER PLANT

CROSS-REFERENCE TO RELATED APPLICATION

This application claims priority to and benefit of Chinese Application No. 201320091797.1, entitled "System and Method for Operating a Power Plant", filed Feb. 28, 2013, which is herein incorporated by reference in its entirety.

BACKGROUND

The subject matter disclosed herein relates to a system and method for operating a power plant.

A gas turbine system, e.g., in a power plant, generally combusts one or more fuels to drive a turbine. The mechanical power may be used to drive an electrical generator or various other loads. Unfortunately, the gas turbine system may occasionally shut down and/or startup for maintenance, repair, or other reasons. During startup and/or shut down, certain resources, such as high-pressure fuels, may be unavailable for use by the gas turbine system. For example, the gas turbine system may use a liquid fuel during startup due to various constraints, and use a syngas fuel only after startup during a steady state mode of the gas turbine system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system including a fuel-supply system including, an auxiliary-fuel-gas compressor configured to compress a fuel for use by a gas-turbine system, an expander configured to generate power by expanding an oxidant from the gas-turbine system, and a motor/generator configured to function in a motor mode and in a generator mode, wherein the motor/generator drives fuel compression with the auxiliary fuel-gas compressor in the motor mode, and the motor/generator generates power in the generator mode as the expander uses oxidant from the gas-turbine system to drive the motor/generator.

In a second embodiment, an apparatus including, a fuel-supply system including, a fuel-gas compressor/expander configured to operate in a compressor mode and in an expander mode, wherein the fuel-gas compressor/expander compresses fuel in the compressor mode, and the fuel-gas compressor/expander generates power in the expander mode using oxidant from a gas-turbine system; and a motor/generator configured to function in a motor mode and in a generator mode, wherein the motor/generator drives fuel compression with the fuel-gas compressor/expander in the motor mode, and the motor/generator generates power in the generator mode as the fuel-gas compressor/expander drives the motor/generator using oxidant from the gas-turbine system.

In a third embodiment, a method including, initiating a startup mode of a gas-turbine system, starting a motor/generator in a motor mode for the startup mode, compressing fuel for the startup mode using an auxiliary-fuel-gas compressor driven by the motor/generator in the motor mode, transitioning the gas-turbine system into a steady-state mode, driving a primary-fuel-gas compressor with the gas-turbine system to compress fuel for use in the gas-turbine system during the steady-state mode, disengaging the auxiliary-fuel-gas compressor, and transitioning the motor/generator from the motor mode to a generator mode after disengaging the auxiliary-fuel-gas compressor.

In a fourth embodiment, a method including, initiating a startup mode of a gas-turbine system, starting a motor/generator in a motor mode for the startup mode, compressing fuel for the startup mode using a fuel-gas compressor/expander in a compressor mode, transitioning the gas-turbine system into a steady-state mode, driving a primary-fuel-gas compressor with the gas-turbine system to compress fuel for use in the gas-turbine system during the steady state mode, stopping compression of fuel with the fuel-gas compressor/expander, and purging fuel from fuel-gas compressor/expander with a purge gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a flowchart of an exemplary method for using a fuel-supply system.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to a system and method for increasing the efficiency of a power plant. More specifically, the disclosed embodiments disclose a fuel-supply system capable of compressing fuel for a gas-turbine system during startup, and generating electricity from excess compressed oxidant produced by the gas-turbine system during steady-state operations. In certain embodiments, the fuel-supply system includes a motor/generator, an auxiliary-fuel-gas compressor, and an expander. The motor/generator is capable of functioning in two modes: a first mode for compressing fuel gas with the fuel-gas compressor during startup of a gas-turbine system, and a second generator mode to generate electricity with the expander using excess compressed oxidant from the gas-turbine system. In another embodiment, the fuel-supply system includes a fuel-gas compressor/expander that functions in two modes: a compressor mode capable of compressing fuel gas during startup of a gas-turbine system, and an expander mode capable of using excess compressed oxidant to generate electricity. In the compressor mode, the fuel-gas compressor/expander is driven by the motor mode of the motor/generator to compress fuel, while in the expander mode the fuel-gas compressor/expander expands compressed oxidant to generate mechanical power for driving the motor/generator in a generator mode.

Figure 1:
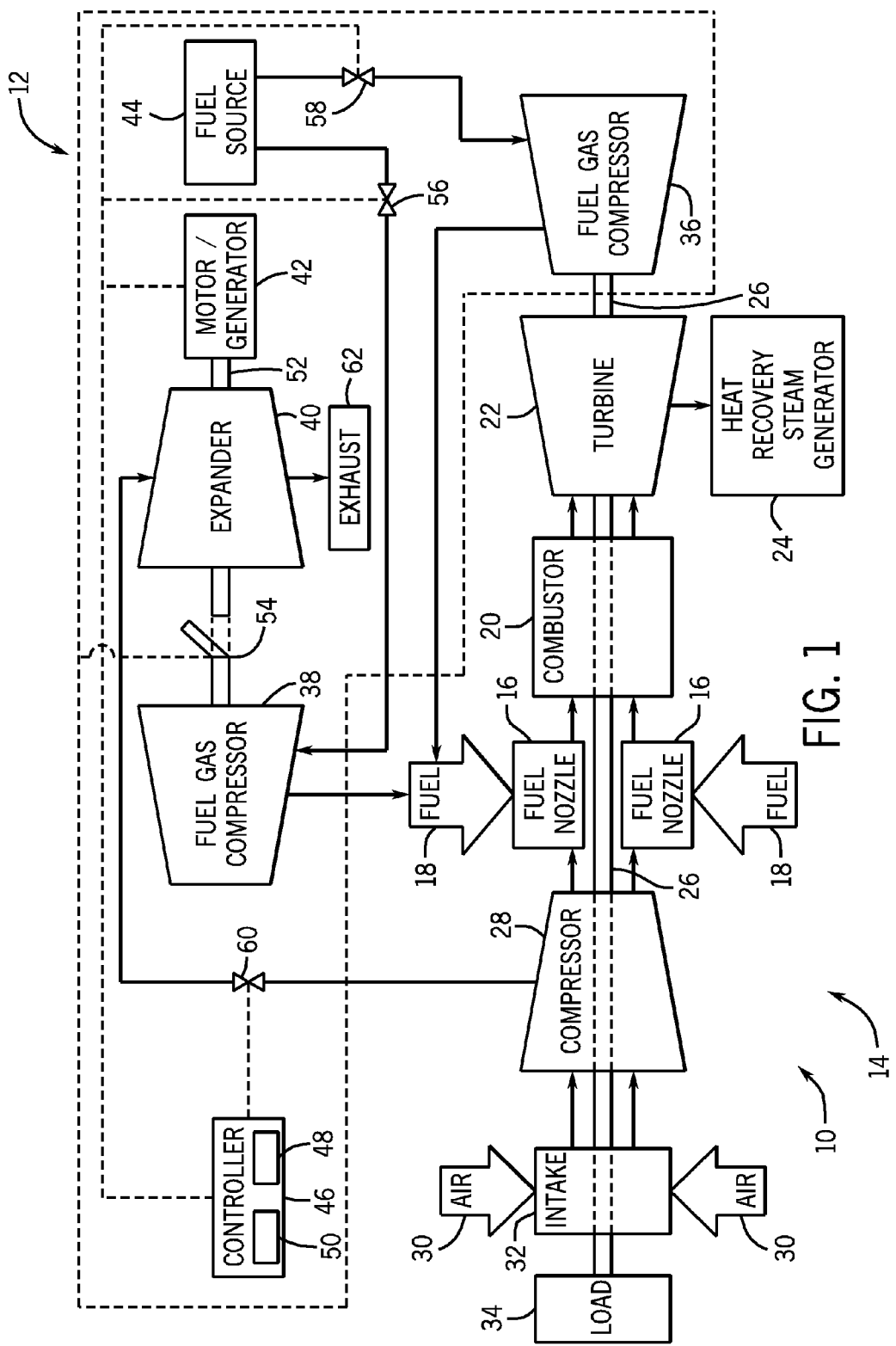
FIG. 1 is a schematic of an embodiment of a power plant with a fuel-supply system.

FIG. 1 is a schematic of an embodiment of a power plant 10 with a fuel-supply system 12. The fuel-supply system 12 is configured to compress a gaseous fuel (e.g., syngas, natural gas, methane, or other gas fuel) to start and run the power plant 10, as well as use excess compressed oxidant (e.g., air, oxygen, oxygen enriched air, oxygen reduced air, or by combination thereof) produced by the power plant 10 to generate electricity. For example, the power plant 10 includes a gas-turbine system 14, which may produce excess compressed oxidant. The fuel-supply system 12 enables the power plant 10 to use the excess compressed oxidant to generate electricity, improving the efficiency of the power plant 10.

As illustrated, the power plant 10 includes the gas-turbine system 14. The turbine system 14 uses a compressed-gas fuel, such as natural gas and/or a hydrogen rich synthetic gas, to run the gas-turbine system 14. As depicted, a plurality of fuel nozzles 16 intakes a fuel supply 18, mixes the fuel with oxidant, and distributes the oxidant-fuel mixture into a combustor 20. The oxidant-fuel mixture combusts in a chamber within combustor 20, thereby creating hot pressurized exhaust gases. The combustor 20 directs the exhaust gases through a turbine 22 and into a heat-recovery-steam generator (HRSG) 24. As the exhaust gases pass through the turbine 22, the gases force one or more turbine blades to rotate a shaft 26 along an axis of the gas-turbine system 14. As illustrated, the shaft 26 may connect to various components of turbine system 10, including an oxidant compressor 28. The oxidant compressor 28 includes blades that may couple to the shaft 26. As the shaft 26 rotates, the blades within the oxidant compressor 28 also rotate, thereby compressing oxidant 30 from an oxidant intake 32 through the oxidant compressor 28 and into the fuel nozzles 16 and/or combustor 20. The shaft 26 may also connect to a load 34 (e.g., an electrical generator) and a fuel-gas compressor 36. As will be understood, the load 34 may include any suitable device capable of being powered by the rotational output of turbine system 14.

In operation, oxidant 30 enters the gas-turbine system 14 through the oxidant intake 32 and may be pressurized in the oxidant compressor 28. The compressed oxidant then mixes with fuel for combustion within combustor 20. For example, the fuel nozzles 16 may inject an oxidant-fuel mixture into the combustor 20 in a suitable ratio for optimal combustion, emissions, fuel consumption, and power output. The combustion of the oxidant-fuel mixture generates hot-pressurized-exhaust gases, which then drive one or more stages of turbine blades within the turbine 22 to rotate the shaft 26 that in turn rotates the oxidant compressor 28, load 34, and a fuel-gas compressor 36.

The gas-turbine system 14 receives the compressed fuel 18 for combustion from the fuel-supply system 12. More specifically, the fuel-supply system 12 provides the compressed fuel for both startup and steady-state-gas-turbine-system modes. As illustrated, the fuel-supply system 12 includes the fuel-gas compressor 36 (e.g., a primary-fuel-gas compressor), a fuel-gas compressor 38 (e.g., an auxiliary-fuel-gas compressor), an expander 40, motor generator 42 (e.g., electric motor or electric generator), fuel source 44, and controller 46. The controller 46 includes a processor 48 and a memory 50 storing instructions executable by the processor 48. During a startup mode, the controller 46 executes instructions stored in the memory 50 that start a motor/generator 42 in a motor mode. As will be explained in further detail below, the motor/generator 42 is capable of operating in a motor mode to drive fuel compression, and in a generator mode for generating electricity (e.g., with excess compressed oxidant from the oxidant compressor 28). Again, the motor mode of the motor/generator 42 involves use of electricity to power the motor/generator 42 as a motor to provide mechanical power. The generator mode of the motor/generator 42 involves use of mechanical power to drive the motor/generator 42 as an electrical generator to output electricity. As the motor/generator 42 operates in motor mode, the motor/generator 42 drives a shaft 52, which drives the auxiliary-fuel-gas compressor 38. In some embodiments, the fuel-supply system 12 may include a clutch 54. The controller 46 may engage and disengage the clutch 54 to respectively connect and disconnect the fuel-gas compressor 38 relative to the expander 40 and motor generator 42. Indeed, the controller 46 may engage and disengage the clutch 54 to enable and disable the fuel-gas compressor during different modes of operation (e.g., steady state and startup modes). In certain embodiments, the motor generator 42 may be located between and couple to both the fuel gas compressor 38 and the expander 40 with respective clutches 54. In still other embodiments, the fuel-supply system 12 may not include a clutch 54. After starting the motor/generator 42 and engaging the clutch 54 to be driven by the motor generator 42, the controller 46 may execute instructions to open the valve 56. As illustrated, the valve 56 controls flow of fuel from the fuel source 44 into the fuel-gas compressor 38. Once the controller 46 opens the valve 56, fuel flows from the fuel source 44 into the auxiliary-fuel-gas compressor 38, where the fuel is compressed for use in the gas-turbine system 14 (e.g., in the fuel nozzles 16). The auxiliary-fuel-gas compressor 38 may flare and/or recycle fuel gas until the pressure of the fuel gas reaches the desired pressure for use in the gas turbine system 14. The gas-turbine system 14 then combusts the compressed fuel from the auxiliary-fuel-gas compressor 38 to begin operating (e.g., during a startup mode of the gas turbine system 14).

After starting up the gas-turbine system 14 with the compressed fuel from the auxiliary-fuel-gas compressor 38, the gas-turbine system 14 transitions to steady-state operations. In some embodiments, the controller 46 may gradually transition from a startup mode using the fuel gas compressor 38 to a steady state mode using the fuel gas compressor 36 for supplying fuel to the fuel nozzles 16 of the gas turbine system 14, thereby enabling use of a gas fuel (e.g., the same or different) during both startup and steady state of the gas turbine system 14. During the transition, the fuel gas compressor 36 may flare and/or recycle fuel gas until the pressure of the fuel gas reaches the desired pressure for use in the gas turbine system 14. As explained above, once the gas-turbine system 14 begins operating, the exhaust gases pass through the turbine 22 forcing one or more stages of turbine blades to rotate the shaft 26. The rotation of the shaft 26 induces operation of the primary-fuel-gas compressor 36. During steady-state operations, the primary-fuel-gas compressor 36 may be used to compress the fuel for the gas-turbine system 14. More specifically, the controller 46 executes instructions opening the valve 58 enabling fuel to travel from the fuel source 44 and into the primary-fuel-gas compressor 36. The primary-fuel-gas compressor 36 then uses the rotational energy of the shaft 26 to compress fuel for use in the gas-turbine system 14. The primary-fuel-gas compressor 36 outputs the compressed fuel to the fuel nozzle 16 for combustion in the combustor 20, thus maintaining steady-state operation of the gas-turbine system 14.

Once the gas-turbine system 14 transitions to the steady-state mode (e.g., using the primary-fuel-gas compressor 36 to provide the compressed fuel), the controller 46 executes instructions to close valve 56, disengage clutch 54, and to turn off the motor mode of the motor/generator 42. As a result, the controller 46 stops fuel compression by the auxiliary-fuel-gas compressor 38, and transitions the motor/generator 42 to a generator mode. Again, the motor mode of the motor/generator 42 involves use of electricity to power the motor/generator 42 as a motor to provide mechanical power. The generator mode of the motor/generator 42 involves use of mechanical power to drive the motor/generator 42 as an electrical generator to output electricity. As explained above, during steady-state operations the oxidant compressor 28 of the gas-turbine system 14 may produce excess compressed oxidant. The fuel-supply system 12 uses the excess compressed oxidant to drive the expander 40 and in turn the motor/generator 42 (e.g., as an electrical generator) to generate electricity, thus increasing the overall efficiency of the power plant 10. The controller 46 begins the transition from fuel-gas compression to electricity generation by opening compressed-oxidant valve 60. When valve 60 opens, excess compressed oxidant travels from the oxidant compressor 28 to the expander 40. The expander 40 (e.g., a turbine) and may include one or more turbine blades coupled to the shaft 52. During operation, the compressed oxidant enters the expander 40 inducing rotation of the blades and the shaft 52. After using energy from the compressed oxidant, the expander 40 vents the oxidant to an exhaust 62 or in some embodiments to a heat recovery steam generator (HRSG). The motor/generator 42 now operating in generator mode uses the rotational energy of the shaft 52 to generate electricity for the power plant 10 or the power grid. Accordingly, the fuel-supply system 12 increases the overall efficiency of the power plant 10 by reducing energy waste of the gas-turbine system 14.

Figure 2:
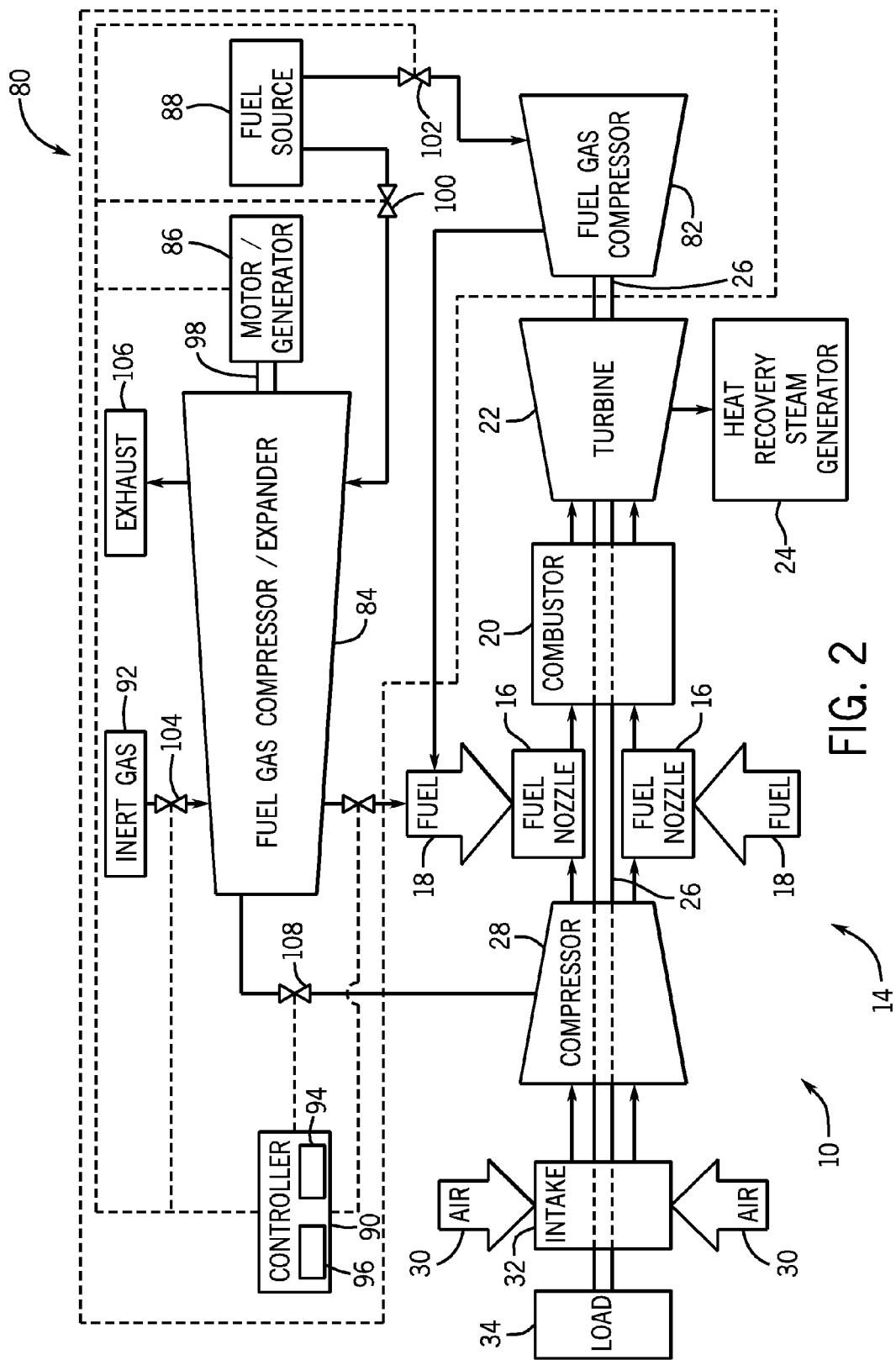
FIG. 2 is a schematic of an embodiment of a power plant with a fuel-supply system.

FIG. 2 is a schematic of an embodiment of the power plant 10 with a fuel-supply system 80. The fuel-supply system 80 is configured to compress fuel (e.g., syngas, natural gas, etc.), in order to start and run the power plant 10, as well as use excess compressed oxidant produced by the power plant 10 to generate electricity. As discussed above, the power plant 10 includes a gas-turbine system 14, which may produce excess compressed oxidant. The fuel-supply system 80 enables the power plant 10 to use the excess compressed oxidant to generate electricity, improving the efficiency of the power plant 10.

The turbine system 14 uses a compressed gas fuel, such as natural gas and/or a hydrogen rich synthetic gas, to run the gas-turbine system 14. As explained above, a plurality of fuel nozzles 16 intakes a fuel supply 18, mixes the fuel with oxidant, and distributes the oxidant-fuel mixture into a combustor 20. The oxidant—fuel mixture combusts in a chamber within combustor 20, thereby creating hot pressurized exhaust gases. The combustor 20 directs the exhaust gases through a turbine 22 and into a heat-recovery-steam generator (HRSG) 24. As the exhaust gases pass through the turbine 22, the gases force one or more turbine blades to rotate a shaft 26 along an axis of the gas-turbine system 14. As illustrated, the shaft 26 may connect to various components of turbine system 10, including an oxidant compressor 28. The oxidant compressor 28 includes blades that may couple to the shaft 26. As the shaft 26 rotates, the blades within the oxidant compressor 28 also rotate, thereby compressing oxidant 30 from an oxidant intake 32 through the oxidant compressor 28 and into the fuel nozzles 16 and/or combustor 20. The shaft 26 may also connect to a load 34 (e.g., an electrical generator) and a fuel-gas compressor 36. As will be understood, the load 34 may include any suitable device capable of being powered by the rotational output of turbine system 14.

The gas-turbine system 14 receives the compressed fuel 18 for combustion from the fuel-supply system 80. More specifically, the fuel-supply system 80 provides the compressed fuel for both startup and steady state modes of the gas-turbine system 14. As illustrated, the fuel-supply system 80 includes the fuel-gas compressor 82 (e.g., a primary-fuel-gas compressor), a fuel-gas compressor/expander 84 (e.g., an auxiliary-fuel-gas compressor or oxidant compressor), motor generator 86 (e.g., electric motor or electric generator), fuel source 88, controller 90, and an inert gas source 92. The controller 90 includes a processor 94, and a memory 96 with instructions executable by the processor 94. During a startup mode, the controller 90 executes instructions stored in the memory 96 to start a motor/generator 86 in a motor mode (e.g., to use electricity to generate mechanical power). As will be explained in further detail below, the motor/generator 86 and the fuel-gas compressor/expander 84 are capable of operating in two modes. Specifically, the motor/generator 86 is capable of operating in a motor mode that drives the fuel-gas compressor/expander 84 in a compression mode (e.g., compressing fuel gas), and the motor/generator 86 may operate in a generator mode (e.g., generating electricity) when the fuel-gas compressor/expander 84 operates in an expander mode (e.g., expanding compressed oxidant to generate mechanical power). As the motor/generator 86 operates in motor mode, the motor/generator 86 drives a shaft 96 that in turn drives the fuel-gas compressor/expander 84 in a compression mode. After starting the motor/generator 86, via the motor mode the controller 90 may execute instructions to open the valve 100. As illustrated, the valve 100 controls flow of fuel from the fuel source 88 into the fuel-gas compressor/expander 84. Once the controller 90 opens the valve 100, fuel flows from the fuel source 88 into the fuel-gas compressor/expander 84 (e.g., operating in the compression mode), where the fuel is compressed for use in the fuel nozzles 16 of the gas-turbine system 14. The fuel-gas compressor/expander 84 may flare and/or recycle fuel gas until the pressure of the fuel gas reaches the desired pressure for use in the gas turbine system 14. The gas-turbine system 14 then combusts the compressed fuel from the auxiliary-fuel-gas compressor 84 to begin operating.

After starting the gas-turbine system 14 with the compressed fuel from the fuel-gas compressor/expander 84, the gas-turbine system 14 transitions to steady-state operations. During the transition, the fuel gas compressor 82 may flare and/or recycle fuel gas until the pressure of the fuel gas reaches the desired pressure for use in the gas turbine system 14. As explained above, once the gas-turbine system 14 begins operating the exhaust gases pass through the turbine 22 forcing one or more turbine blades to rotate the shaft 26. The rotation of the shaft 26 induces operation of the primary-fuel-gas compressor 82. During steady-state operations, the primary-fuel-gas compressor 82 compresses the fuel for the gas-turbine system 14. More specifically, the controller 90 executes instructions opening the valve 102 enabling fuel to travel from the fuel source 88 and into the primary-fuel-gas compressor 82. The primary-fuel-gas compressor 82 then uses the rotational energy of the shaft 26 to compress fuel for use in the gas-turbine system 14. The primary-fuel-gas compressor 82 outputs the compressed fuel to the fuel nozzle 16 for combustion in the combustor 20, thus maintaining steady-state operation of the gas-turbine system 14.

Once the gas-turbine system 14 transitions to the steady-state mode (e.g., using the primary-fuel-gas compressor 82 to provide the compressed fuel), the controller 90 executes instructions to close valve 100 and to turn off the motor mode of the motor/generator 86. As a result, the controller 90 stops fuel compression by the fuel-gas compressor/expander 84, and transitions the motor/generator 86 to a generator mode. As explained above, during steady-state operations, the oxidant compressor 28 of the gas-turbine system 14 may produce excess compressed oxidant. The fuel-supply system 80 uses the excess compressed oxidant to generate electricity, thus increasing the overall efficiency of the power plant 10. The controller 90 begins the transition of the compressor/expander 84 from fuel gas compression to electricity generation by opening valve 104 releasing inert gas (e.g., nitrogen, argon, etc.) from the inert gas source 92 into the fuel-gas compressor/expander 84. As inert gas flows through the fuel-gas compressor/expander 84, the inert gas expels the fuel gas out of the fuel-gas compressor/expander 84 and into an exhaust 106 or in some embodiments to an HRSG. After removing the fuel gas from the compressor/expander 84, the controller 90 executes instructions opening valve 108 to route excess compressed oxidant from the oxidant compressor 28 into the fuel-gas compressor/expander 84. As the compressed oxidant enters the fuel-gas compressor/expander 84, the fuel-gas compressor/expander 84 transitions into an expander mode. In the expander mode, the fuel-gas compressor/expander 84 is driven by the compressed oxidant as it expands and drives blades coupled to the shaft 84. More specifically, as the compressed oxidant passes through the fuel-gas compressor/turbine 84, the oxidant induces rotation of one or more stages of turbine blades coupled to the shaft 98 to generate mechanical power. After using energy from the compressed oxidant to drive the shaft 98, the oxidant vents into an exhaust 106 or in some embodiments to an HRSG. The motor/generator 86 now operating in generator mode uses the rotational energy of the shaft 98 to generate electricity for the power plant 10 or a power grid. Accordingly, the fuel-supply system 80 increases the overall efficiency of the power plant 10 by reducing energy waste of the gas-turbine system 14.

Figure 3:
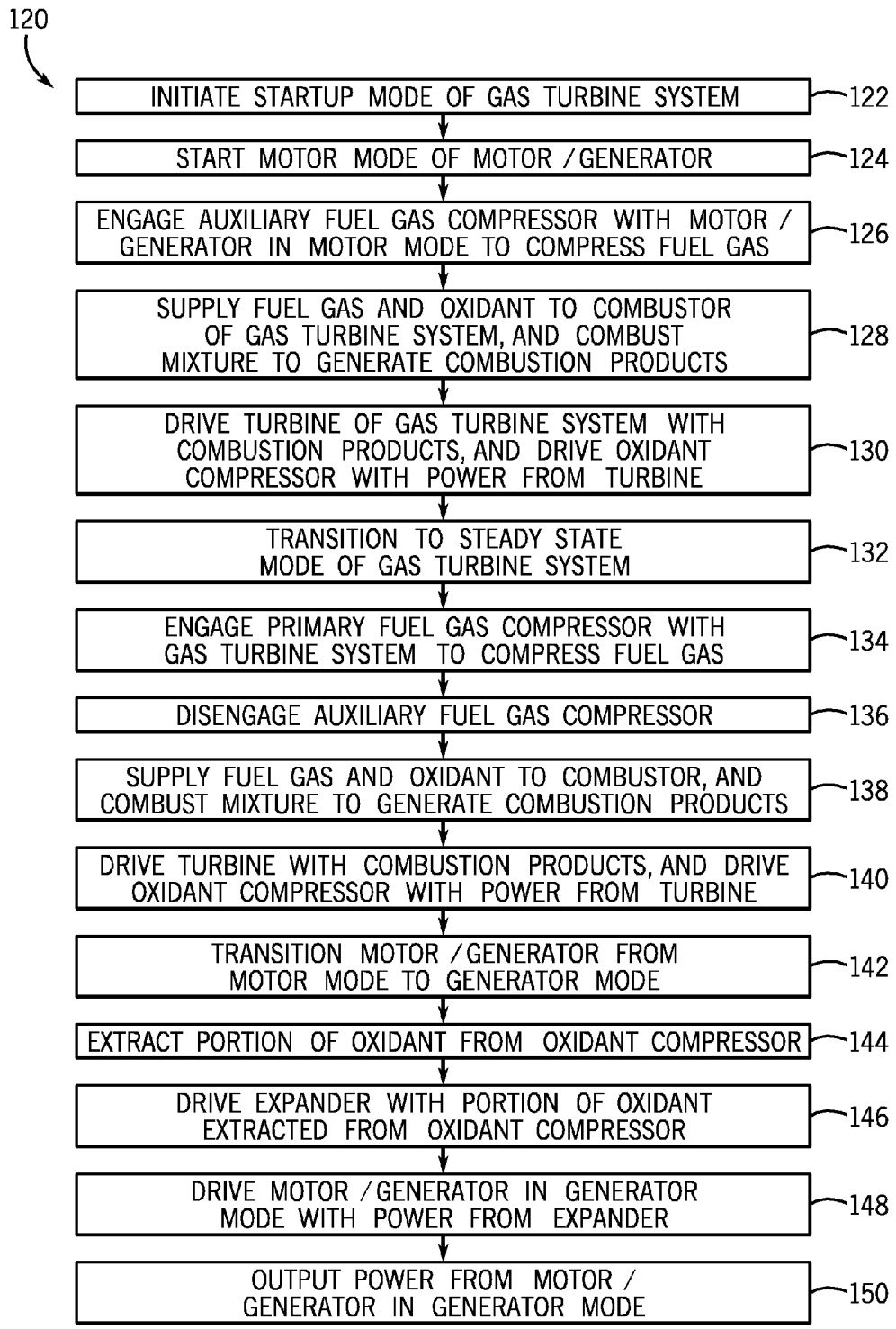
FIG. 3 is a flowchart of an exemplary method for using a fuel-supply system.

FIG. 3 is a flowchart of an exemplary method 120 for using a fuel-supply system 12. The method 120 begins by initiating a startup mode of the gas-turbine system 14 (block 122). In the startup mode, the controller 46 starts the motor/generator 42 in a motor mode (block 124). As the motor/generator 42 operates in the motor mode, the controller 46 may engage the auxiliary-fuel-gas compressor 38 by engaging the clutch 54, enabling the fuel-gas compressor 38 to compress fuel (e.g., gas fuel) with power from the motor/generator 42 (e.g., mechanical power transmitted through the shaft 52) (block 126). The compressed fuel is then combined with oxidant in the gas-turbine system 14 to generate an oxidant-fuel mixture. The oxidant-fuel mixture is supplied to the combustor 20, where the mixture combusts generating combustion products (e.g., exhaust gas) (block 128). The exhaust gases drive the turbine 22, generating mechanical power that drives the oxidant compressor 28 (block 130). Once the gas-turbine system 14 begins operating, the method 120 transitions the gas-turbine system 14 from a startup mode to a steady-state mode (block 132). In the steady-state mode, the turbine 22 drives fuel gas compression with the primary-fuel-gas compressor 36 (block 134). As the primary-fuel-gas compressor 36 supplies compressed fuel to the gas-turbine system 14, the controller 46 executes instructions disengaging the auxiliary-fuel-gas compressor 38 (block 136). The gas-turbine system 14 then supplies, mixes, and combusts compressed fuel gas (e.g., produced with the primary-fuel-gas compressor 36) and oxidant in the combustor 20, generating combustion products (e.g., exhaust gas) (block 138). The exhaust gases drive the turbine 22, enabling the turbine 22 to drive the oxidant compressor 28 (block 140). With the primary-fuel-gas compressor 36 supplying the compressed fuel for the gas-turbine system 14, the controller 46 executes instructions transitioning the motor/generator 42 from the motor mode to the generator mode (block 142). After switching the motor/generator 42 to the generator mode, the controller 46 executes instructions enabling excess compressed oxidant to exit the oxidant compressor 28 and enter the expander 40 (block 144). As the excess compressed oxidant flows through the expander 40, the compressed oxidant drives the expander 40 (e.g., driving turbine rotors), thereby generating mechanical energy with the shaft 52 (block 146). The shaft 52 then drives the motor/generator 42 (e.g., operating as an electrical generator in the generator mode) with power from the expander 40 (block 148). The electrical power generated by the motor/generator 42 may then be output for use by the power plant 10 or to an electrical grid increasing the efficiency of the power plant 10 (block 150).

FIG. 4 is a flowchart of an exemplary method 160 for using a fuel-supply system 80. The method 160 begins by initiating a startup mode of the gas-turbine system 14 (block 162). In the startup mode, the controller 90 starts the motor/generator 86 in a motor mode (block 164). As the motor/generator 86 operates in the motor mode, the motor/generator 86 engages the fuel-gas compressor/expander 84, operating the fuel-gas compressor/expander 84 in a compressor mode (e.g., compressing fuel gas) (block 166). The compressed fuel is combined with oxidant in the gas-turbine system 14 to generate an oxidant-fuel mixture. The oxidant-fuel mixture is supplied to the combustor 20, where the mixture combusts generating combustion products (e.g., exhaust gas) (block 168). The exhaust gases drive the turbine 22, generating mechanical power that drives the oxidant compressor 28 (block 170). Once the gas-turbine system 14 begins operating, the method 160 transitions the gas-turbine system 14 from a startup mode to a steady-state mode (block 172). In the steady-state mode, the turbine 22 drives fuel gas compression with the primary-fuel-gas compressor 82 (block 174). As the primary-fuel-gas compressor 82 supplies compressed fuel to the gas-turbine system 14, the controller 90 executes instructions stopping the compressor mode of the fuel-gas compressor/expander 84 (block 176). The gas-turbine system 14 then supplies, mixes, and combusts compressed fuel gas (e.g., produced with the primary-fuel-gas compressor 82) and oxidant, in the combustor 20, generating combustion products (e.g., exhaust gas) (block 178). The exhaust gases drive the turbine 22, enabling the turbine 22 to drive the oxidant compressor 28

(block 180). With the primary-fuel-gas compressor 82 supplying the compressed fuel for the gas-turbine system 14, the controller 90 executes instructions transitioning the fuel-gas compressor/expander 84 from the compressor mode to the expander mode (block 182). More specifically, the controller 90 executes instructions to purge the fuel-gas compressor/expander 84 with a purge gas (e.g., an inert gas) (block 184). For example, the inert gas may include nitrogen, argon, etc. After switching the motor/generator 86 to the generator mode and purging the fuel-gas compressor/expander 84 of fuel gas, the controller 90 executes instructions enabling excess compressed oxidant to exit the oxidant compressor 28 and enter the fuel-gas compressor/expander 84 (block 186). As the excess compressed oxidant flows through the fuel-gas compressor/expander 84, the compressed oxidant drives the fuel-gas compressor/expander 84 operating in the expander mode, generating mechanical energy with the shaft 98 (block 188). The shaft 98 then drives the motor/generator 86 in the generator mode with power from the fuel-gas compressor/expander 84 (block 190). The electrical power generated by the motor/generator 86 may then be output for use by the power plant 10 or to an electrical grid increasing the efficiency of the power plant 10 (block 192).

Technical effects of the invention include the ability to increase a power plant's efficiency by using excess compressed oxidant produced by an oxidant compressor. More specifically, the disclosed embodiments disclose a fuel-supply system capable of compressing a fuel gas during gas-turbine system startup, and then using the fuel-supply system to provide electrical power with excess compressed oxidant during steady-state operations of the gas-turbine system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a fuel-supply system comprising:
      a fuel-gas compressor-expander configured to operate in a compressor mode and in an expander mode, wherein the fuel-gas compressor-expander compresses fuel in the compressor mode, and the fuel-gas compressor-expander generates power in the expander mode using oxidant from a gas-turbine system; and
      a motor-generator configured to function in a motor mode and in a generator mode, wherein the motor-generator drives fuel compression with the fuel-gas compressor-expander in the motor mode, and the motor-generator generates power in the generator mode as the fuel-gas compressor-expander drives the motor-generator using oxidant from the gas-turbine system.

2. The system of claim 1, comprising a controller configured to operate the fuel-gas compressor-expander in the compressor mode during a startup mode of the gas-turbine system, and the controller is configured to operate the fuel-gas compressor-expander in the expander mode during a steady state mode of the gas-turbine system.

3. The system of claim 2, wherein the controller is configured to operate the motor-generator in the motor mode during the startup mode, and the controller is configured to operate the motor-generator in the generator mode during the steady state mode.

4. The system of claim 3, comprising a primary-fuel-gas compressor.

5. The system of claim 4, wherein, a steady-state mode of the gas-turbine system, the controller controls supply of fuel to the gas turbine system with the primary-fuel-gas compressor.

6. The system of claim 4, wherein, a steady-state mode of the gas-turbine system, the controller controls supply of oxidant from the gas-turbine system to the fuel-gas compressor-expander, operating in the expander mode.

7. The system of claim 1, comprising the gas-turbine system.

8. A method, comprising:
   initiating a startup mode of a gas-turbine system;
   starting a motor-generator in a motor mode for the startup mode;
   compressing fuel for the startup mode using a fuel-gas compressor-expander in a compressor mode;
   transitioning the gas-turbine system into a steady-state mode;
   transitioning the motor-generator in a generator mode for the steady-state mode;
   driving a primary-fuel-gas compressor with the gas-turbine system to compress fuel for use in the gas-turbine system during the steady state mode;
   driving the motor-generator in the generator mode with power from the fuel-gas compressor-expander;
   stopping compression of fuel with the fuel-gas compressor-expander; and
   purging fuel from fuel-gas compressor-expander with a purge gas.

9. The method of claim 8, comprising:
   extracting oxidant from an oxidant compressor of the gas-turbine system; and
   driving the fuel-gas compressor-expander in an expander mode with oxidant from the compressor.

* * * * *